United States Patent [19]
Boswank et al.

[11] 3,970,098
[45] July 20, 1976

[54] TANK VENT

[75] Inventors: Stuart E. Boswank, Garland; Robert H. Jones, Euless; Newton P. Whaley, Carrollton, all of Tex.

[73] Assignee: Southwest Wheel and Manufacturing Company, Dallas, Tex.

[22] Filed: Nov. 1, 1974

[21] Appl. No.: 520,059

[52] U.S. Cl. .................... 137/39; 137/43; 137/73
[51] Int. Cl.² .................................... F16K 17/36
[58] Field of Search ............... 137/39, 43, 202, 73; 220/202

[56] References Cited
UNITED STATES PATENTS

| | | | |
|---|---|---|---|
| 1,363,263 | 12/1920 | Ohliger | 137/43 X |
| 2,194,348 | 3/1940 | Zoder | 137/43 |
| 2,510,098 | 6/1950 | Geisler | 137/43 |
| 2,919,707 | 1/1960 | Seidler | 137/43 |
| 3,765,435 | 11/1971 | Schlanzky | 137/39 |
| 3,768,498 | 10/1973 | Urban | 137/43 |
| 3,916,928 | 11/1975 | Enoch | 137/39 |

*Primary Examiner*—Robert G. Nilson
*Attorney, Agent, or Firm*—Richards, Harris and Medlock

[57] ABSTRACT

Disclosed is an improved tank vent. The vent prevents liquid loss if the tank is inverted and prevents contaminants from entering the tank. The vent includes an elongated housing forming a tubular chamber communicating with the interior of the tank. Disposed within the chamber is an annular valve seat. Disposed within the chamber adjacent the valve seat is a free sliding elongated buoyant valve member. The buoyant valve member has a protruding valve surface disposed on the end of the buoyant member adjacent the valve seat. The surface area of the valve surface is significantly less than the surface area of the end of the buoyant member upon which the valve surface is disposed. The valve surface is configured to sealably engage the valve seat for movement into and out of contact with the seat as the buoyant member moves within the chamber. Further disposed within the chamber is a free moving weighted member which moves the buoyant member to engage the protruding valve surface with the valve seat when the tank is inverted. Recessed passageways which slope toward the tank surface connect the chamber through the annular valve seat to the exterior of the tank.

6 Claims, 4 Drawing Figures

TANK VENT

BACKGROUND OF THE INVENTION

1. Field of the Invention

The present invention relates to tank vents. More specifically, this invention relates to an improvement in venting devices for use in selectively venting tanks containing liquids while preventing contaminants from entering the tank.

2. Prior Art

Venting devices for liquid tanks have long been known in the art. The simplest of these devices consists of a tube mounted on the uppermost portion of the tank wall. The tube communicates with the interior and exterior of the tank to facilitate introduction or withdrawal of liquid from the tank by allowing equalization of pressure on the contained liquid surface.

Although most venting devices are effective in equalizing the pressure within the vessel, some are not satisfactory when the tanks upon which they are mounted become other than stationary. For example, most vents satisfactorily operate only so long as the tank remains upright. Liquid tanks, such as fuel tanks and the like, may in transport be inverted allowing the fluid contained therein to escape through the vent. Such fluid loss becomes more than an economic detriment and inconvenience when the fluid being transported within the tank is flammable. The spillage or leakage of such fluids creates a fire hazard. Moreover, when the tank is a fuel tank used in a passenger vehicle such as an automobile, truck, bus, or the like, such leakage and the resulting fire hazard becomes potentially lethal to vehicle occupants. Such leakage is particularly hazardous in the aftermath of an accident.

Recently, government safety standards were promulgated which require that venting apparatus on fuel tanks used in passenger vehicles contain a means to prevent loss of fuel when the tank is overturned. To comply with these safety standards, a venting assembly has recently been developed. This assembly incorporates a spherical buoyant member, which is free to move into contact with an annular valve seat to seal the vent opening. Additionally, situated adjacent the buoyant member is a weighted member. The weighted member is free to move the buoyant member into contact with the annular valve seat by means of gravitationally forcing the buoyant member against the valve seat. Thus, the spherical surface of the buoyant member acts as a valve surface. The vent is constructed such that the weighted member is in a position to gravitationally force the buoyant member to contact the annular valve seat when the valve seat is located below the buoyant member. Such a situation normally occurs when the tank is rotated more than 90° about its own axis.

Since a portion of the spherical surface of the buoyant member functions as the valve surface, the force applied by the weighted member must be distributed over a large area. If the area were smaller, the force required to sealably seat the valve surface within the annular valve seat would be less. Because of dimensional constraints within the vent chamber, the size and thus the weight of the weighted member is limited. Likewise the buoyancy of the buoyant member is limited. Therefore magnitude of the component vector applied by the weighted member upon the buoyant member is also limited. Therefore, if the tank is tilted to angles just greater than 90° from vertical, the magnitude of vector force applied by the weighted member to the buoyant member can be only of a sufficient magnitude to seat the smaller valve surface.

A second disadvantage of heretofore known vent assemblies is that contaminants could gain access to the interior of the tank through the assembly. The vents communicated with the exterior of the tank by means of small orifices that become easily clogged. Further these orifices were disposed at such an angle that they become easily clogged or had to be constantly maintained. Such maintenance is expensive, and failure to so maintain a free flowing vent may result in a non-safe pressure buildup or tank collapse.

SUMMARY OF THE INVENTION

The present invention broadly provides an improved leakproof tank vent mechanism. According to the invention, there is provided an improved wall mounted tank vent mechanism having an elongated tubular housing containing a passageway therein which communicates between the interior and exterior of the tank. Within the passageway is disposed a fixed annular valve seat adapted to receive in sealing contact therewith a valve surface. Within the chambered passageway adjacent the annular valve seat is a free-sliding elongated buoyant member, having a protruding valve surface. The protruding valve surface is disposed on the end of the buoyant member adjacent the valve seat. The valve surface has a surface area significantly smaller than the surface area of the end of the buoyant member upon which the valve surface is disposed. The protruding valve surface is adapted for moving into and out of contact with the fixed annular valve seat. A free moving weighted member disposed within the chambered passageway is adjacent the buoyant member and is capable of direct contact therewith. The weight of the weighted member is greater than the combined buoyancy of the buoyant member and the weighted member.

According to a preferred embodiment of the invention, an end of the chamber proximate the exterior of the tank communicates with an inclined passageway. The inclined passageway communicates with the exterior of the tank through a recess disposed proximate the tank surface.

BRIEF DESCRIPTION OF THE DRAWINGS

The features and object of this invention will become apparent from the following detailed description of the specific embodiments when read in conjunction with the accompanying drawings wherein.

DESCRIPTION OF THE PREFERRED EMBODIMENT

Figure 1:
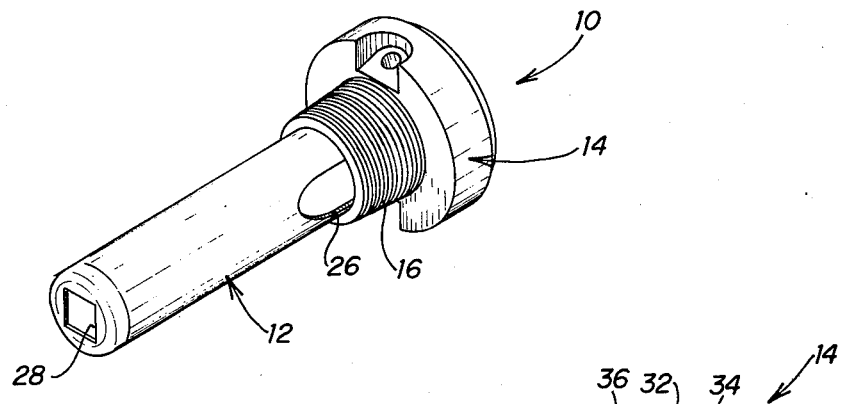
FIG. 1 is a perspective view of the tank venting mechanism of the present invention.
Figure 2:
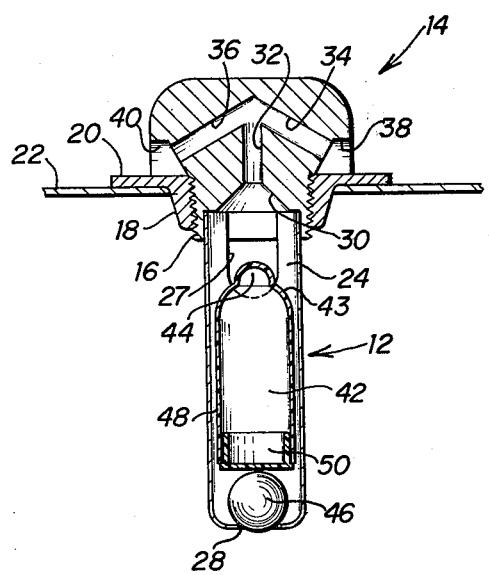
FIG. 2 shows an axial section of the venting mechanism of the present invention installed in its normal operating position in a tank wall.

Referring now to the drawings wherein like reference characters designate like or corresponding parts throughout the several views there is illustrated in FIG. 1 the improved wall mounted tank vent of the present invention which for purposes of description is designated generally by reference numeral 10. The vent operates to equalize the pressure within a tank containing a liquid while preventing liquid loss if the tank is inverted. In addition contaminants are prevented from entering the vented tank. Vent 10 has an elongated tubular housing 12 connected to a flanged head member 14. As best illustrated in FIG. 2, member 14 has an externally threaded portion 16 which is sealingly secured to an internally threaded adapter 18 attached to a circular opening in the wall of a tank 22.

Housing 12 defines a tubular chamber 24. Chamber 24 communicates with the interior of the tank through the housing wall by means of apertures 26 and 27, which form a pair of such apertures symmetrically disposed on either side of housing 12. Chamber 24 also communicates with the interior of tank 22 by means of an aperture 28 disposed at one end of housing 12.

Chamber 24 extends axially through the housing 12. A frustro-conically shaped valve seat 30 is provided at one end of the housing 12. A passageway 32 passes axially through the center of seat 30. Two radially extending passageways 34 and 36 connect passageway 32 with the exterior of tank 22. The passageways 34 and 36 extend with respect to passageway 32 at an acute angle of about 45°. Recesses 38 and 40 are formed respectively of the ends of passageways 34 and 36.

Thus, chamber 24 communicates with the interior of the tank by means of apertures 26, 27 and 28. Chamber 24 also communicates with the exterior of the tank 22 through passageways 32, 34 and 36 and recesses 38 and 40.

An elongated buoyant member 42 is disposed within the chamber 24 adjacent seat 30. Buoyant member 42 is cylindrical in shape, and is such a size to reciprocate axially within the chamber 24. Buoyant member 42 is effectively restricted from moving other than axially along the longitudinal axis of the chamber or rotationally about the longitudinal axis. A protruding valve surface 44 is disposed on an end 43 of elongated buoyant member 42. The surface area of valve surface 44 is significantly less than the surface area of the end 43. The buoyant member 42 is disposed in the chamber 24 such that the axial movement of the member 42 will cause surface 44 to sealably contact the seat 30.

Thus, as can be seen, the buoyancy of the buoyant member and the weight of the weighted member are more or less limited by the confines of the chamber. However, because the surface area of the valve surface 44 is significantly less than that of the end 43, less force is required to sealingly seat the surface 44 than would be required to seat the totality of the end 43. Therefore, for a given buoyant member and a given weighted member, the smaller the valve surface the more force is applied per square unit of area to the valve surface-valve seat interface. It is this force or pressure per square unit that is effective in sealing the interface.

A weighted member 46 is disposed in chamber 24 adjacent the buoyant member 42 and away from seat 30. The weighted member 46 is preferably spherical and of a non-corrosive material having a high specific density. Member 46 has a diameter less than the inside diameter of housing 12 but greater than that of aperture 28. Weighted member 46 has a weight greater than the combined buoyant force of the weighted member 46 and the buoyant member 42. The weighted member 46 is preferably formed of stainless steel.

Thus, as can be seen, weighted member 46, having a diameter less than the inside diameter of housing 12 is free to move within the chamber 24 and directly contact buoyant member 42.

Figure 3:
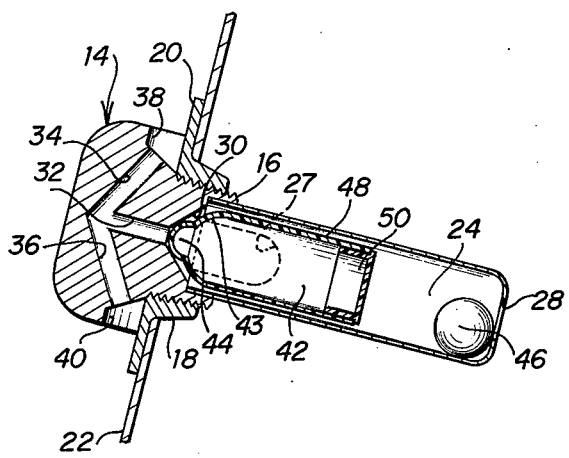
FIG. 3 is a view similar to FIG. 2 illustrating the position of the buoyant member disposed within the tank liquid with the tank rotated at slightly 90°than 90° from vertical.
Figure 4:
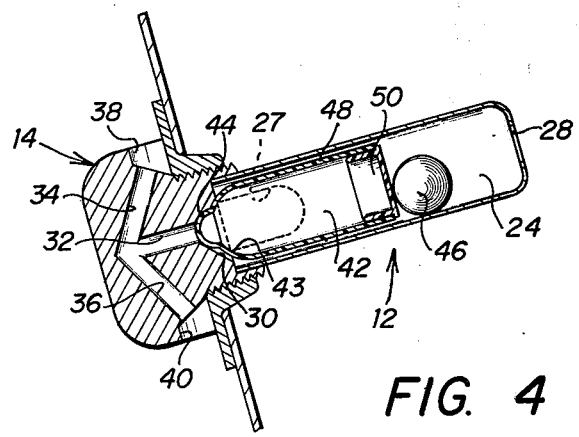
FIG. 4 is a view similar to FIG. 2 illustrating the position of the buoyant member in the tank liquid with the tank rotated slightly greater than 90° from vertical.

The operation of the wall mounted vent 10 will be understood by reference to FIGS. 2, 3 and 4. Each of these figures illustrates a specific position of the tank 22. In FIG. 2, the mechanism is shown in its normal upright position. The weighted member 46 is resting on the lower portion of housing 12. As can be seen in FIG. 2, the level of the liquid within the chamber 24 is below the vent 10 and therefore not sufficient to buoy the buoyant member 42. However, it is apparent that as the liquid level within chamber 24 rises, buoyant member 42 will float toward the seat 30, driving protruding valve surface 44 into sealed contact with seat 30, thus sealing passageway 32 and preventing liquid from escaping the tank.

In FIG. 3, the mechanism is shown rotated from vertical slightly less than 90°. Weighted member 46 remains in the lower portion of chamber 24. In FIG. 3 there is sufficient liquid within the tank to cause buoyant member 42 to float toward seat 30, driving protruding valve surface 44 into sealed contact with the seat 30, sealing passageway 32 and preventing liquid from escaping.

FIG. 4 shows the mechanism rotated at an angle slightly greater than 90° from upright. The weighted member 46 in FIG. 4 is resting forward within chamber 24 in contact with buoyant member 42, thus gravitationally forcing surface 44 into sealing contact with valve seat 30 and preventing liquid from escaping. It is apparent in FIG. 4 that the level of the liquid within the tank is of no consequence in the operation of the vent. In the position illustrated in FIG. 4, the weighted member 46 will gravitationally force the member 42 and thus the surface 44 into sealing contact with the seat 30, even if the tank is empty.

In contrast, the configuration of the tank illustrated in FIG. 3 will not cause sealing of passageway 32 unless the liquid within the tank is at a sufficient level to float buoyant member 42 into contact with seat 30. Thus, as can be seen, the venting device 10 in accordance with the present invention is effective to close the passageway 32 and thus prevent liquid contained in the tank from escaping while at all other times allowing the tank to vent regardless of the orientation of the tank. Furthermore, because the protruding valve surface 44 is substantially smaller than the end 43 of the buoyant member 42, the gravitational force exerted by the weighted member 46 is sufficient to sealably seat the protruding valve surface 44 within the frusto-conical valve seat 30. Likewise the buoyant force of the buoyant member 42 is sufficient to sealably seat the protruding valve surface 44 within the frustro-conical valve seat 30.

In accordance with the embodiment illustrated, buoyant member 42 is hollow and comprises two separate and distinct pieces of an upper body 48 and a seal plug 50. The upper body 48 is a single molded piece with the protruding valve surface 44 formed thereon. Upper body 48 may be formed by any means known in the art, for example, injection or vacuum molding with a material suitable for use in the liquid contained in the tank. Such forming technique is preferred to allow a smooth uniform surface on protruding valve surface 44. Such a smooth, uniform valve surface facilitates the sealing of the contact point between the surface 44 and the seat 30 with the minimum of force.

Seal plug 50 may also be a molded piece being made of the same or similar material which is inserted into the bottom of the upper body member 48 to form a sealed air-tight container. Sealing of the plug 50 to the upper body 48 may be accomplished with a suitable sealant such as an epoxy resin and the like. It is envisioned of course that the member 42 could be formed in other manners.

In accordance with one embodiment of the invention, the protruding valve surface 44 is spherical. It is intended as being within the scope of the invention that the valve surface be of any configuration adapted to sealably mate with a corresponding valve seat to seal passageway 32. For example, frustro-conical and cylindrical surfaces can be used.

In accordance with the invention, the buoyant member is elongated to restrict "tumbling" within the chamber 24. A cylindrical buoyant member is preferably used in conjunction with a cylindrical housing, but use of a rectangular buoyant member in a rectangular housing is within the scope of the invention.

In accordance with the invention, the head member 14 carrying thereon the externally threaded portion 16 is made of a thermosensitive material that is temperature degradable. A thermosensitive material such as rosewood, or the like may be utilized. When the thermosensitive material is utilized, exposing the tank surface proximate the head member 14 to a sufficient temperature, causes the material to melt. The melting degrades the seal between the threaded adapter 18 and the externally threaded portion 16, rupturing the tank integrity. Use of thermosensitive material as above described, prevents explosion of an over-pressured tank in the presence of sufficient heat.

In accordance with the invention, the radial passageways 34 and 36 are directed toward the tank surface such that falling particles may not enter when the tank is in the upright position. The length of the radially extending passageway is preferably about 9/16 inch. The recesses 38 and 40 communicating with the radially extending apertures 36 and 34, respectively, are of sufficient depth and size to prevent particulate matter and liquid thrust parallel to the tank surface from entering the radially extending apertures 34 and 36. The recesses are preferably 3/16 inch deep.

Obviously many modifications and variations of the present invention are possible in light of the above teachings. It is therefore to be understood that within the scope of the appended claims the invention may be practiced otherwise than as specifically described.

What is claimed is:

1. An improved wall mounted tank vent comprising:
  a. a housing forming a chambered passageway communicating between the interior and exterior of said tank;
  b. a fixed annular valve seat disposed within said chambered passageway;
  c. a free sliding elongated buoyant member disposed within said chambered passageway adjacent said fixed annular valve seat;
  d. a protruding valve surface, disposed on the end of said buoyant member proximate said annular seat, having a surface area substantially smaller than the surface area of said end and being adapted to sealably move into and out of contact with said annular seat;
  e. a free moving weighted member disposed within said chamber adjacent said buoyant member and capable of direct contact therewith, said weighted member having a weight greater than the combined buoyant force of said buoyant member and said weighted member;
  f. a passageway communicating with said chambered passageway through said annular seat; and
  g. at least one radial aperture sloped toward said tank, communicating between said passageway and the exterior of said tank through a recess substantially larger in diameter than said aperture.

2. The vent of claim 1 wherein said free sliding buoyant member is cylindrical;
  wherein said protruding valve surface is spherical;
  wherein said fixed annular seat is frustro-conical; and
  wherein said weighted member is spherical and formed from stainless steel material.

3. The vent of claim 2 wherein said cylindrical buoyant member comprises:
  a. an upper body of a single molded piece containing said spherical protruding valve surface; and
  b. a seal plug inserted into said upper body forming an air tight seal with said upper body.

4. A wall mounted tank vent for selectively venting the differential in gas pressure between the interior and exterior of a tank containing a liquid comprising:
  a. a flanged head member formed of a thermosensitive material and containing a set of exterior threads adapted to be sealably disposed within the wall of said tank;
  b. a housing connected at one end to said head and forming a chamber therein which communicates with the interior and exterior of said tank;
  c. a fixed annular frustro-conically shaped valve seat disposed within said chamber at the end of said chamber proximate said head member;
  d. a free sliding, elongated, cylindrical buoyant member adjacent said valve seat;
  e. a protruding cylindrical valve surface, disposed on the end of said free sliding buoyant member adjacent said fixed annular seat having a surface area substantially less than the surface area of said end;
  f. a free moving weighted member, disposed within said chamber adjacent the end of said buoyant member opposite said valve surface capable of direct contact with said buoyant member and having a weight at least slightly greater than the combined buoyant force of said buoyant member and said weighted member;
  g. a vertical passageway disposed within said head having one end communicating with said chamber through said annular valve seat;
  h. a pair of radial apertures contained in said head, sloped toward said tank, and communicating with said vertical passageway; and
  i. a pair of recesses, disposed within said head and having an inside diameter substantially larger than that of said radial aperture, each one communicating between one of said apertures and the exterior of said tank.

5. The vent of claim 4 in combination with an internally threaded adapter, adapted to receive the external threads of said head, and containing a flanged portion thereon adapted to be sealingly attached to the wall of said tank.

6. In a wall mounted tank vent having a housing forming a chamber communicating between the interior and exterior of the tank wherein the chamber contains an annular valve seat disposed therein, a free sliding buoyant member disposed adjacent the fixed annular valve seat, and a free moving weighted member having a weight greater than the combined buoyant force of the buoyant member and the weighted member disposed adjacent and capable of direct contact with the buoyant member, the improvement comprising:

a protruding valve surface, disposed on the end of said buoyant member proximate said annular seat, having a surface area substantially smaller than the surface area of said end and being adapted to sealably move into and out of contact with said annular seat, a passageway communicating with said chamber through said annular seat, at least one radial aperture sloped toward said tank communicating between said passageway and the exterior of said tank through a recess having an inside diameter substantially larger than that of said radial aperture.

* * * * *

UNITED STATES PATENT OFFICE
CERTIFICATE OF CORRECTION

Patent No. 3,970,098   Dated July 20, 1976

Inventor(s) Stuart E. Boswank et al

It is certified that error appears in the above-identified patent and that said Letters Patent are hereby corrected as shown below:

Column 2, line 59, "90° than 90°" should read:
---- less than 90° ----.

Signed and Sealed this

Fourth Day of January 1977

[SEAL]

Attest:

RUTH C. MASON
Attesting Officer

C. MARSHALL DANN
Commissioner of Patents and Trademarks